United States Patent
Bochinski

[15] 3,699,559
[45] Oct. 17, 1972

[54] CONDUCTIVE FLUID CONTENT DETECTION SYSTEM

[72] Inventor: Julius H. Bochinski, Bethesda, Md.

[73] Assignee: Enviro Control, Inc., Washington, D.C.

[22] Filed: Jan. 7, 1971

[21] Appl. No.: 104,595

[52] U.S. Cl..................340/236, 324/30 R, 324/65
[51] Int. Cl........................G08b 21/00, G01n 27/00
[58] Field of Search .340/236, 233; 324/61, 65, 30 B, 324/71 CP; 73/38; 137/240

[56] References Cited

UNITED STATES PATENTS

| | | |
|---|---|---|
| 3,238,452 | 3/1966 | Schmitt et al............324/61 R |
| 2,385,976 | 10/1945 | Evans et al..........340/233 UX |
| 3,499,461 | 3/1970 | Tuma......................137/240 |
| 3,570,510 | 3/1971 | Tsutsumi..............137/240 X |

Primary Examiner—John W. Caldwell
Assistant Examiner—Daniel Myer
Attorney—Martin E. Gerry

[57] ABSTRACT

A detector assembly for measuring and monitoring quantities of particulate matter suspended in a fluid stream which is structured for injection of a flushing fluid therein. The assembly comprises a fluid sampling enclosure having electrically conductive plates which form cavities at either end of the enclosure and a conduit between these plates for passing the fluid stream. Flushing fluid is injected in the cavities, which fluid passes into the fluid stream through holes in the plates thereby maintaining the plates clean. A bridge circuit in which the plates and the fluid stream constitute an arm of the bridge is used for monitoring and measuring the change in resistance between the plates due to dissolved ions in the fluid stream, or dissolved solids therein.

8 Claims, 6 Drawing Figures

PATENTED OCT 17 1972 3,699,559

INVENTOR.
JULIUS H. BOCHINSKI
BY Martin E Gerry
AGENT.

INVENTOR.
JULIUS H. BOCHINSKI
BY Marten E Gerry
AGENT

CONDUCTIVE FLUID CONTENT DETECTION SYSTEM

BACKGROUND OF THE INVENTION

This invention is related to a method and apparatus for measuring the resistivity of a fluid stream source to detect matter or dissolved ions therein by measuring the electrical resistance of a column of water of the fluid stream.

Resistivity of a fluid stream such as a column of water may be measured by determining its resistance. A change or increase of resistance of the fluid as measured between two conductive plates will be caused by accumulation of algae, slime and other foreign matter on the conductive plates, thereby giving false reading as to the actual fluid column resistance, and consequently a misinterpretation of the quantity of ions or matter dissolved in the fluid stream or column.

Further disadvantages with conventional systems is that wherein a bridge is used powered by direct current, a build-up of chemical compounds occurs on one of the plates thereby also contributing toward measurement errors. Such compounds generally form at an electrical terminal of the power input source to the bridge, often referred to as terminal corrosion.

SUMMARY OF INVENTION

Therefore, it is an object of the invention to overcome accumulation of algae, slime or other matter on the conductive plates of the detector assembly by having such plates perforated and injecting under pressure into the enclosure containing the plates a flushing fluid to continually wash the plate surfaces and to permit passage of the flushing fluid into the fluid stream, thereby maintaining said plates clean and permitting correct resistance measurements to be taken.

It is a further object to utilize in this invention a bridge circuit powered by alternating current to avoid accumulation and build up of chemical compounds at one of the plates thereby improving the reliability of resistance measurements and hence, the correct interpretation of the quantity of matter in the fluid stream, or of the quantity of particulate matter therein.

Therefore, in accordance with the invention, a fluid sampling enclosure containing electrically conductive perforated plates which are connected as one arm of an alternating current powered wheatstone bridge are disposed in the enclosure so as to form cavities at the upper and lower ends and a conduit for the fluid stream between the plates. A pipe system containing a weak saline solution provides means for injecting the saline solution into the cavities so as to keep the plates clean, the saline solution passing through the perforations in the plates and mixing with the fluid stream, thereby maintaining said plates free of any accumulation and guaranteeing correct resistance measurement by the bridge circuit. The fluid sampling enclosure together with the flushing pipe system and the bridge circuitry are provided as one unit which is easily connected to any fluid stream by parts provided therefor, to a source containing the flushing fluid and to ordinary alternating current power mains.

EXEMPLARY EMBODIMENT

Figure 1:
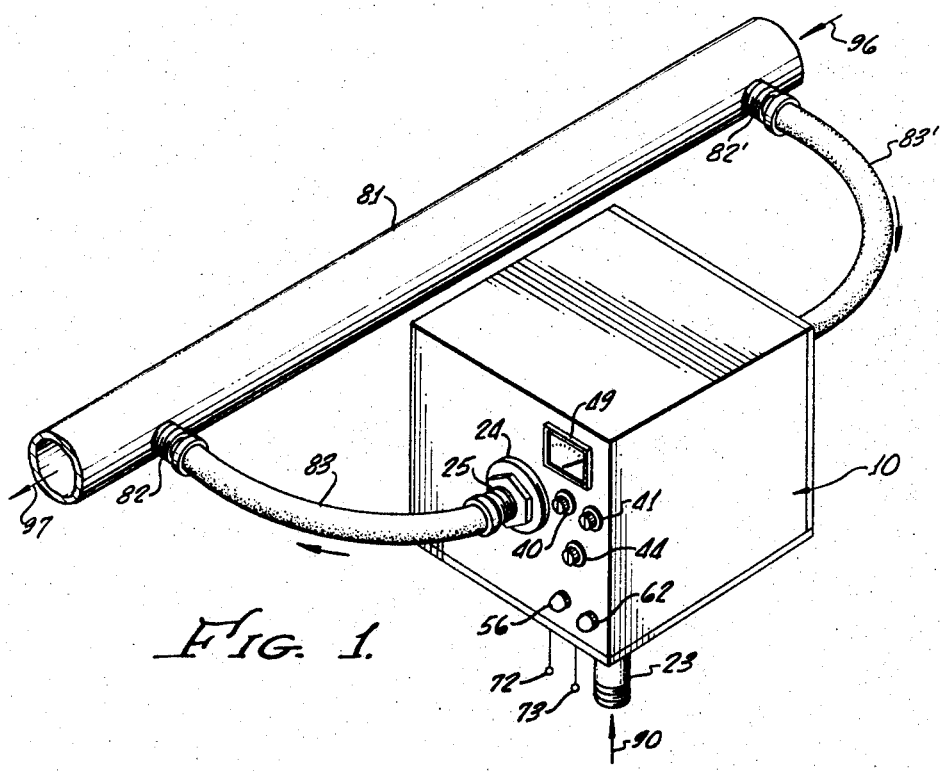
FIG. 1 is a perspective view of the detector assembly shown as connected to a fluid stream pipe. The pipe is tapped off at one point thereon by means of an input pipe to enable injection of a quantity of the fluid stream into the detector assembly and enable the quantity of the fluid stream to be returned by means of an output pipe between the detector assembly exit port and another point on the fluid stream carrying pipe.
Figure 2:
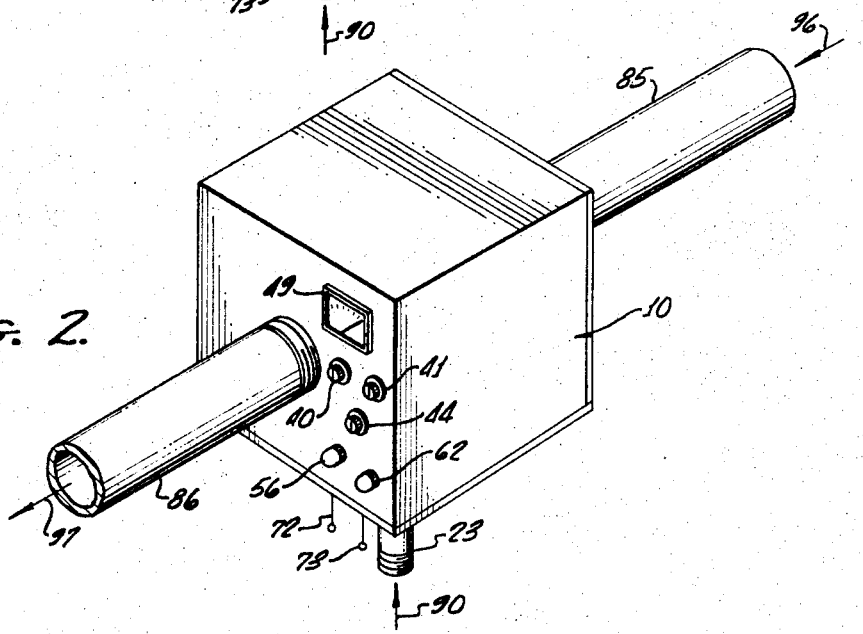
FIG. 2 is a perspective view of the detector assembly shown connected in series with a fluid stream carrying pipe for permitting the fluid stream to pass through the detector assembly.
Figure 4:
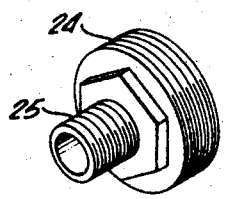
FIG. 4 is a perspective view of an adaptor connecting plate used in the detector assembly at the entrance and exit ports thereof when connection to the fluid stream as shown in FIG. 1 is utilized.

Referring to FIGS. 1, 2, and 4, the invention consisting of an improved detector assembly 10 is shown connected to a fluid system in two different ways.

Referring to FIGS. 1 and 4, detector assembly 10 is connected to a fluid carrying pipe 81 wherein fluid entry occurs at 96 and exits from the pipe at 97 into a system using the fluid. To measure the suspended solids in the system, detector assembly 10 is connected to pipe 81 by tapping off the pipe at two locations. Hence, input sample fluid is constantly fed from pipe 81 at connector point 82' into connecting pipe 83' and into the entrance to detector assembly 10. The fluid in detector assembly 10 is measured therein by the detector assembly system. The fluid exits detector assembly 10 through pipe 83 and reenters pipe 81 at connecting point 82 of pipe 83 to be fed along with fluid 97 exiting pipe 81. Adaptor plate 24 having a pipe connector 25 at its center is used for closing the fluid exit of detector assembly 10 by screwing in same into assembly 10, and for connecting pipe 83 to pipe connector 25. Similarly, another plate 24 (not shown) with a connector like connector 25 is screwed in at the fluid entrance of detector assembly 10 for making connection to the detector assembly by connecting the end of pipe 83' which is opposite to connector 82' to the connector which is similar to connector 25. A clean flushing fluid, such as water with about one percent by weight of sodium chloride concentration, is supplied to the detector assembly from an external source at 90, said external source being connected to connector 23 which provides distribution of the clean flushing fluid to critical portions of the detector system to be hereinafter described. POwer to operate the detector assembly is provided to input wires 72 and 73. Such power is generally 60 cycle, 115 volt single phase power, commonly available. Zero center meter 49 mounted on the front panel, is generally a galvanometer as used in a wheatstone bridge. In this instance this meter is preceded by and has therein a full wave bridge type rectifier to convert the alternating current power inputted thereto to direct current power to operate the galvanometer. Otherwise the bridge circuit in which meter 49 is the sensing device operates in the well known wheatstone bridge manner, to be hereinafter discussed. Controls 40 and 41 are adjustable resistors of corresponding balance arms of the wheatstone bridge, and control 44 is a variable potentiometer for compensating differences in resistance between the remaining correspondingly balance arms of the wheatstone bridge circuit. Meter 49 is an end contact making type meter having end contacts so that upon unbalance in the bridge circuit occurring causing the meter to move completely to the left, left hand contacts are activated and a red lamp 56 and a corresponding buzzer is activated. If the bridge unbalance in operation causes the pointer of meter 49 to move completely to the right then, right hand contacts are activated and a green lamp 62 is lit and a corresponding buzzer is activated.

Referring to FIG. 2, adapter plate 24 is not used for instrumenting detector assembly 10 to the fluid carrying pipe, inasmuch as detector assembly 10 is installed in series with such pipe. Hence, pipe segment 85 is screwed into the entrance end of the detector assembly and pipe segment 86 is screwed into the exit end of the detector assembly. Consequently the fluid being tested or measured will enter at 96 into pipe 85, flow into detector assembly 10, and exit at 97 through pipe segment 86 to feed the process or system whose fluid is being measured for contaminents or solid suspensions therein. Flushing fluid provided at 90 into connector pipe 23, power input at 72 and 73, zero center end contact meter 49 for observing changes in the system, controls 40, 41 and 44 and lamps 56 and 62 are the same as described in connection with FIG. 1.

In both FIGS. 1 and 2, apertures are provided in the outer enclosure of the detector assembly at the exit and entrance of the processing fluid being tested to admit either adapter plates 24 or pipes 85 and 86.

Figure 3:
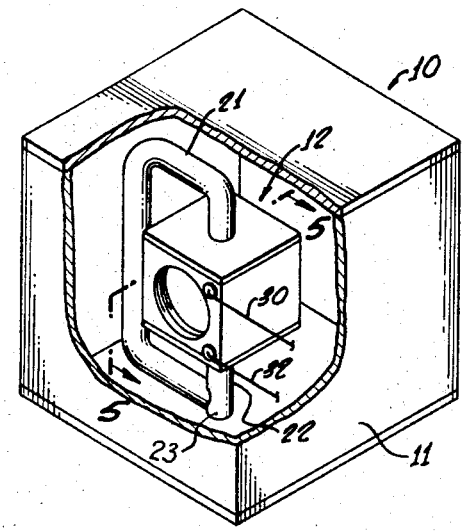
FIG. 3 is a perspective view of the detector assembly showing a partially cut away outer enclosure and exposing the inner enclosure thereof.
Figure 5:
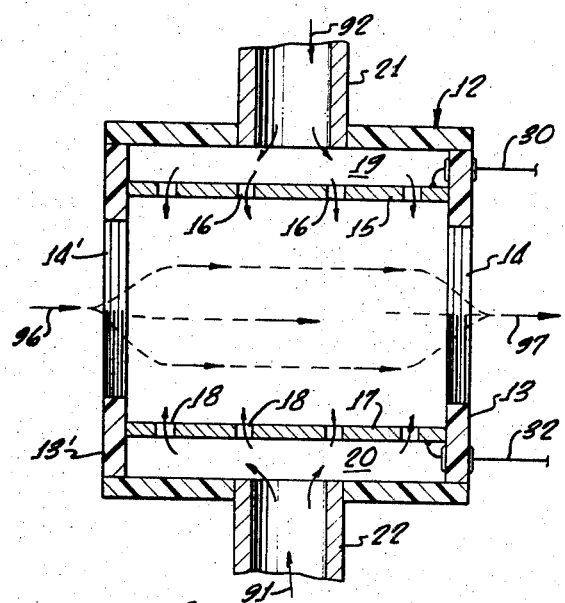
FIG. 5 is a cross-section view taken along plane 5—5 of FIG. 3 showing the inner enclosure fluid handling component details of the detector assembly.

Referring to FIGS. 3 and 5, detector assembly 10 is shown with the outer enclosure 11 partially cut away. Inner enclosure 12 is positioned within outer enclosure 11, and pipes connected to the inner enclosure may be welded or otherwise secured to the outer enclosure. Inner enclosure 12 has threaded adapter plate 13 that forms its exit port 14 and threaded adapter plate 13' that forms its entrance port 14', which plates are secured to the walls of inner enclosure 12. Inner enclosure 12 and adapter plates 13 and 13' will preferably be made of a thermosetting plastic inasmuch as these parts need to serve as electrical insulators in view of perforated metallic electrically conductive plates are required to by installed within enclosure 12. Hence, to understand this installation, FIG. 5 represents a cross-section view taken at plane 5—5 of FIG. 3 in order to view the interior of inner enclosure 12 and portions of the flushing means supply pipes connected thereto. Upper perforated flat metallic plate 15 preferably of nickel or stainless steel is attached to the sidewalls of enclosure 12 at the upper end thereof. Plate 15 has perforations 16 over the entire surface thereof. Plate 15, the upper horizontal wall of chamber 12 and portions of sidewalls of chamber 12 form cavity 19. Likewise, lower perforated flat metallic plate 17 preferably of nickel or stainless steel is attached to the sidewalls of enclosure 12 at the lower end thereof. Plate 17 has perforations 18 over the entire surface thereof. Plate 17, the lower horizontal wall of chamber 12 and portions of sidewalls of chamber 12 form cavity 20. Also the path represented by 96—97 through which the fluid being measured or tested flows is forced between the surfaces of plates 15 and 17.

Connector pipe 23 into which the flushing or cleansing one percent solution of sodium chloride enters from a supply source at 90, forks off into two branches, one branch 21 connecting to the upper end of enclosure 12 permits the cleansing solution of sodium chloride as at 92, to pass into cavity 19, and pass through apertures 16 of plate 15 and pass into the main stream of fluid under test. The other branch of the fork is pipe segment 22 connected to the lower end of enclosure 12 permits the cleansing solution of sodium chloride as at 91 to pass into cavity 20, pass through apertures 18 of plate 17 and pass into the main stream of the fluid under test.

Pipe end with connector 23 extends through an aperture at the base of enclosure 11, the bottom and top of pipe portion 21 may be used to weld or attach the pipe to the inner surface of enclosure 11 and the side of pipe portion 21 may be used to secure this pipe to the sidewall of the inner enclosure 11.

Electrical wire 30 attached to plate 15 and electrical wire 32 attached to plate 17 are used as connecting points to the wheatstone bridge to replace calibrating resistor 40 after bridge had been balanced.

In operation, therefore, when a clean solution, such as a one percent solution of sodium chloride is fed at input connector 23 from source at 90, such solution injected into cavities 19 and 20 is forced through apertures 16 and 18 into the main stream fluid. Measurements made by use of the bridge circuit to be described are reliable since the column of fluid being measured can be relied upon to determine its resistance change, in view of the fact that resistance change due to build up of containments, by crystalization on the electrodes or corrosion of the electrodes due to build up of foreign matter thereon is prevented by the constant flushing of these electrodes 15 and 17 by the clean water saline solution or the like entering into cavities 19 and 20 and passing into the fluid stream.

Alternating current is desirable as a power source for the bridge to avoid electrolysis at plates 15—17 or at the terminals to which such plates are connected. Direct current would cause electrolytic action and contamination of one of the electrodes 15—17.

Figure 6:
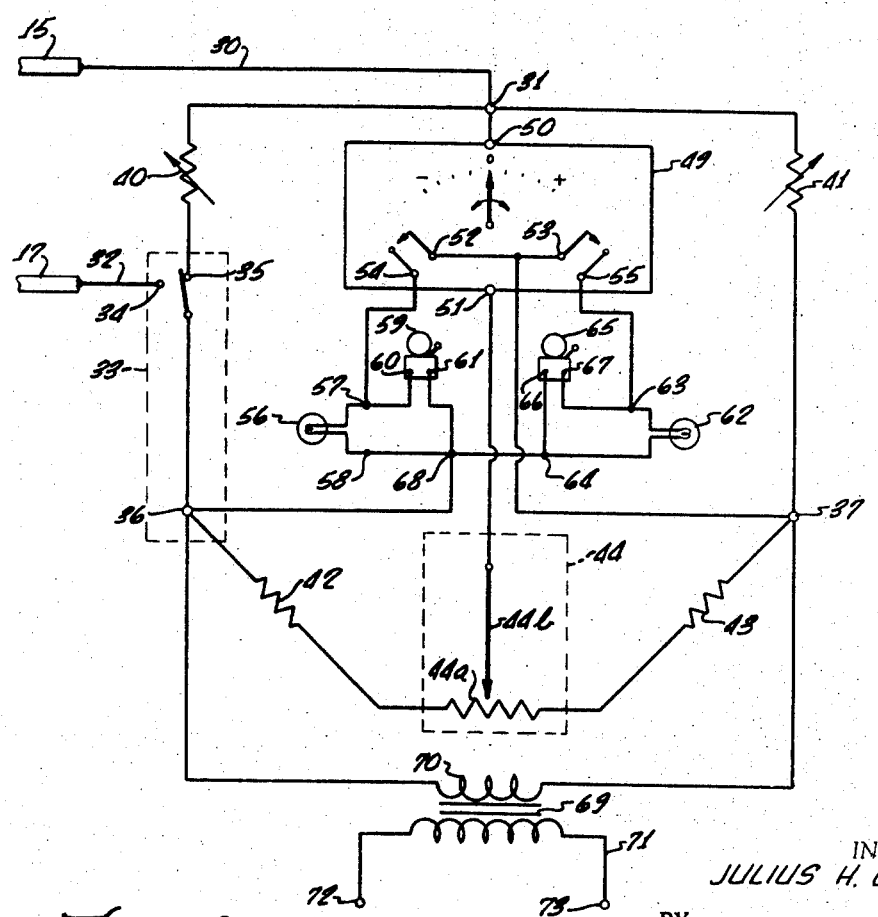
FIG. 6 is a schematic representation of the conductive plates as used in FIG. 5 connected to a bridge testing and measuring circuit. The representation of the conductive plates implies the presence of the fluid stream flowing therebetween.

Referring to FIG. 6, plates 15 and 17 as used in FIG. 5 are connected to a wheatstone bridge circuit by means of wires 30 and 32. Wire 30 is connected to terminal 31 of the bridge and wire 32 is connected to stationery terminal 34 of two-position switch 33. Switch 33 has stationery terminal 35 and movable arm identified in terms of terminal 36 of the bridge. Adjustable resistors or potentiometers of bridge 40 and 41 are handled as a pair of arms of the bridge. Potentiometer 40 is connected between terminal 31 of the bridge and terminal 35 of switch 33. Potentiometer 41 is connected between terminal 31 and terminal 37 of the bridge. Fixed resistors 42 and 43 are substantially matched, resistor 42 being connected between terminal 36 of the bridge and one end of resistor element 44a of potentiometer 44. Resistor 43 is connected between terminal 37 of the bridge and the other end of fixed resistor element 44a of potentiometer 44. The movable arm 44b of potentiometer 44 is connected to terminal 51 of meter 49. Also, terminal 31 of the bridge is connected to terminal 50 of meter 49.

Movable contacts 52 on left side of meter 49 and movable contact 53 on right side of the meter are interconnected and electrically connected to terminal 37 of the bridge. Left stationery contact 54 of the meter is electrically connected to terminal 57 of red warning lamp 56 and to terminal 60 of bell or buzzer 59, operating simultaneously therewith. Right stationery contact 55 of the meter is electrically connected to terminal 63 of the green warning lamp 62 and to terminal 67 of bell or buzzer 65 operating simultaneously therewith. Terminal 58 of lamp 56 is electrically connected to terminal 64 of lamp 62, to terminals 61 of bell 59, to terminal 66 of bell 65, to terminal 68 of the meter lamp circuit and to terminal 36 of the bridge. Transformer 69 is a step down transformer connecting 115 volt input provided at wires 72—73 and consequently across primary wiring 71 to a lower voltage such as 4, 6, or 12 volts across secondary winding 70 for operating the system. Transformer secondary is consequently connected to terminals 36 and 37 of the bridge.

To calibrate the system although the value of potentiometer 40 for a particular application is known, for such minor deviations in the system and to assure a perfect null reading of the bridge circuit prior to substituting the column of fluid stream in enclosure 12 for potentiometer 40, it will be desirable to calibrate the bridge in a conventional manner with potentiometer 40 in the circuit.

Briefly, in the calibration position, arm of switch 33 represented by terminal 36 will cooperate with contact 35. Power is applied at terminals 72 and 73. Arm 44b is adjusted to compensate for manufacturing tolerance errors in resistors 42 and 43, and potentiometers 40 and 41 are all adjusted to result in a zero or center scale reading of meter 49. If potentiometer pair 40 and 41 have been correctly chosen so that they are of the same value, and that such value substantially represents the resistance of the column of fluid stream flowing between plates 15—17 including the flushing solution entering through perforations from cavities 19 and 20, which resistance of the fluid column is the value of resistance when minimum tolerable suspended solids are present in such fluid stream column, then the reading obtained when switch 33 is positioned so as to switch in the actual fluid column by causing terminal 36 representative of the movable arm of switch 33 to cooperate with contact 34 of switch 33, will be zero, or in other words the same reading as obtained by calibrating the bridge with its own potentiometer arm 40 in the circuit instead of the fluid steam column. If the solution containing matter as chemically or otherwise determined is minimal desired, it is a simple matter to obtain current balance and values of potentiometers 40 and 41 by first substituting the fluid column in the bridge circuit, adjusting potentiometer 41 to cause meter 49 to read zero, and then substitute potentiometer 40 for the fluid column by repositioning switch 33 and obtaining its value. It is important to know the exact value of resistance of the fluid column at minimal dissolved ions therein, inasmuch as when solids begin to accumulate and the resistance of the fluid column changes to cause meter 49 to go either to the left or right dependent upon which direction the resistance of the column has gone (increase or decrease), then the quantity of dissolved ions in the fluid column can be determined from a prepared chart which can be read as a function of the amount of increase or decrease in resistance, by merely switching in substitute potentiometer 40 for the fluid column and determining the amount setting increase or decrease in its resistance from its initial setting it would have to be changed in order to return the meter to zero center reading.

Of course, the obvious advantage of having the end contact reading meter is to enable the red or green lamp and associated bell or buzzer to sound off as soon as the dissolved ions in the fluid column are beyond tolerance. The other obvious advantage of being able to measure quantitively the amound of deviation in resistance of the fluid column goes with attendant knowledge by operation of the system as to what purification measures must be taken, or if it is a fluid column feeding a process, which fluid has gone beyond allowable contaminent limits, this system will indicate the requirement to change the fluid entirely.

To further the understanding of the operation of the bridge of FIG. 6, the following values are assigned.
Let $N$ = value of resistor 42 + ½(value of 44a)
$P$ = value of resistor 43 + ½(value of 44a)
$X$ = value of potentiometer 41
$M$ = value of potentiometer 40 or the fluid stream column in enclosure 12
$G$ = internal resistance of meter 49 as measured between terminals 51 and 50.
$E$ = applied ac voltage across bridge terminals 36 and 37.
$I_G$ = current flowing through meter 49

In the following calculation the value of resistance will be the AC resistance at 60 cycles per second, which will be only slightly higher than the DC resistance. Hence, from the solution for resultant current in meter given in Physics by Housemann and Slack, 2nd Edition, August 1939, page 381, published by D. Van Nostrand Company, New York, the meter current is given as:

$$I_G = E \cdot \frac{NX - MP}{(M+X)(GN+NP+PG)+MX(N+P)}$$

It is obvious from above that a balance will occur when $NX = MP$ at which time the numerator will go to zero, bringing the current to zero.

Wherein we assume that $N = P$, and $M = X$, $(NX - MP) = (PX - XP) = 0$.

Assuming value of $N=P$, then if $X$ is larger than $M$, $I_G$ will be positive causing the pointer of the meter to swing to the right, indicative of an increase in resistance value, and hence an increase in resistance of the fluid stream column if the fluid column is used to balance the bridge instead of potentiometer 40. Conversely, if $X$ is smaller than $M$, $I_G$ will be negative indicative of a decrease in resistance value of the fluid stream column.

It should be noted that the flushing fluid represented by arrows 91 and 92 passing through the perforations in plates 16 and 17 is small in quantity and in rate of flow compared to the process stream fluid flowing between plates 16—17. Hence, even though the flow directions are perpendicular to each other, due to the small quantities of flushing fluid, the measurement of the fluid stream column resistivity will not be affected by the presence and flow direction of the flushing fluid, the flushing fluid mixing with the process fluid stream.

An example of the application and use of this detector assembly is given as follows:

Water streams that are used to supply industrial areas are frequently monitored for dissolved solids or concentrations of solids by utilizing conductivity sensors of water, particularly when water streams are to be used as drinking water for humans and animals located downstream of the industrial areas. Bearing in mind that conductivity is the inverse of resistivity, we may discuss this application in terms of conductivity but keeping in mind that the bridge circuit hereinabove described measures resistance changes quantitatively. Hence, when the conductivity of this exemplary water stream exceeds the accepted standard, the offending industrial plant contributing excessive contaminents may be identified through the monitor system, herein described, and the excess contaminents reduced. Substantially a conductivity of about 700 micromhos/cm is an acceptable standard for drinking water in many locations. Such conductivity is equivalent to about 1,400 ohms/cm resistivity. For a column of water about 100 cm high the resistance of the column should be in the order of about 140,000 ohms. Changes in such resistance is easily possible to determine with a bridge circuit by utilizing the calibrated potentiometer as above described, and for a first order of magnitude accuracy at 60 cycles per second the resistance values should be not much greater than measurements made when the bridge is powered with direct current.

In practice, the conductive plates of FIG. 5 would normally become covered with dirt and slime and give erroneous measurements that may exceed or be below the true measurements, of the water stream column, but for the presence of the flushing fluid constantaly cleaning the plates, as hereinabove described.

Were the flushing fluid arrangement not included in this device, actual pollution of streams and ordinance violations as to excess contaminents would go unnoticed, preventing the necessary corrective action from being taken.

It is also noted, that although the bridge of FIG. 6 was referred to herein as a wheatstone bridge, with the assumptions made as to the compensating function of component 44a for the difference in resistances between resistors 42 and 43, the bridge is in reality a general purpose bridge with all arms thereof being resistive and therefore behaving as a wheatstone bridge.

I claim:

1. A detector and a measuring and monitoring assembly for determining quantities of matter in a fluid stream having suitable structure for injection of a flushing fluid therein, comprising in combination:

a fluid sampling enclosure comprising electrically conductive plates within said enclosure, said plates being disposed with respect to each other at opposite ends of the enclosure thereby forming a first cavity at one end of the enclosure, forming a second cavity at the other end of the enclosure, and also forming a conduit between said conductive plates for enabling said fluid stream to flow through the formed conduit, said plates having apertures therein;

means comprising an alternating current activated bridge circuit wherein one of the arms thereof constitutes the electrically conductive plates and the fluid stream and flushing fluid mixture flowing therebetween for measuring the change in resistance between said electrically conductive plates; and means attached to entryways of said enclosure for providing feed paths into said first and second cavities for injecting into each of the cavities said flushing fluid which fills the cavities and passes through said apertures mixing with the fluid stream to maintain said electrically conductive plates free of accumulations.

2. The invention as stated in claim 1, wherein said alternating current activated bridge circuit includes:

a zero centered meter relay having end contact pairs and warning means for providing warning when there has been a change in the resistance of the fluid stream due to change in the quantity of said matter therein; thereby providing said monitoring feature.

3. The invention as stated in claim 1, wherein the means attached to the entryways comprises:

a pipe having pipe connection means at its input end, which pipe branches off into multiple branches for making connections with said entryways.

4. The invention as stated in claim 1, including:

an outer enclosure for enclosing the fluid sampling enclosure, the means connected to the electrically conductive plates for measure-monitoring the fluid stream, and the means attached to the entryways of the fluid sampling enclosure.

5. The invention as stated in claim 1, including:

a fluid stream supply source; and adapter plates secured to the fluid sampling enclosure, said adapter plates having entry and exit ports for interconnecting the fluid sampling enclosure at two points of the fluid stream supply source.

6. The invention as stated in claim 1, including:

a fluid stream supply source; and means adapted at either end of said fluid sampling enclosure for inserting said detector assembly in series with the fluid stream supply source.

7. The invention as stated in claim 4, including:

measuring indicator and warning means mounted on said outer enclosure for accessibility and ease of monitoring.

8. The invention as stated in claim 1:

said matter being particulate suspensions.

* * * * *